M. A. ZOOK.
TRACTION MACHINE.
APPLICATION FILED DEC. 26, 1914.

1,251,613.                                                                 Patented Jan. 1, 1918.

WITNESSES:
Chas. C. Green.
F. H. Allwardt

INVENTOR
M. Alva Zook.

UNITED STATES PATENT OFFICE.

MORRIS ALVA ZOOK, OF WILKINSBURG, PENNSYLVANIA.

TRACTION-MACHINE.

1,251,613. Specification of Letters Patent. Patented Jan. 1, 1918.

Application filed December 26, 1914. Serial No. 879,150.

*To all whom it may concern:*

Be it known that I, MORRIS ALVA ZOOK, a citizen of the United States, residing at Wilkinsburg, in the county of Allegheny and State of Pennsylvania, have invented a new and useful Traction-Machine, of which the following is a specification.

My invention is a light tractor principally for farm use. The objects of my invention are: to provide farmers with a traction machine which will do pulling and hauling and furnish power for driving other machinery more conveniently and at less cost than horses; to provide a machine that could be manufactured cheap enough to be sold to farmers at less than the total selling price of the number of horses the average farmer keeps—in this invention low cost of manufatcure is the most important consideration after satisfactory operation.

The invention consists of a traction wheel guided by two steering wheels, the traction wheel so constructed as to avoid the usually troublesome feature of slipping and digging itself into the ground; the simplest possible gearing to transmit the power of an internal combustion engine to the traction wheel or wheels in either direction as desired; and a simple one handle means for controlling the steering, starting and stopping, and reversing of the machine.

Figure 1:
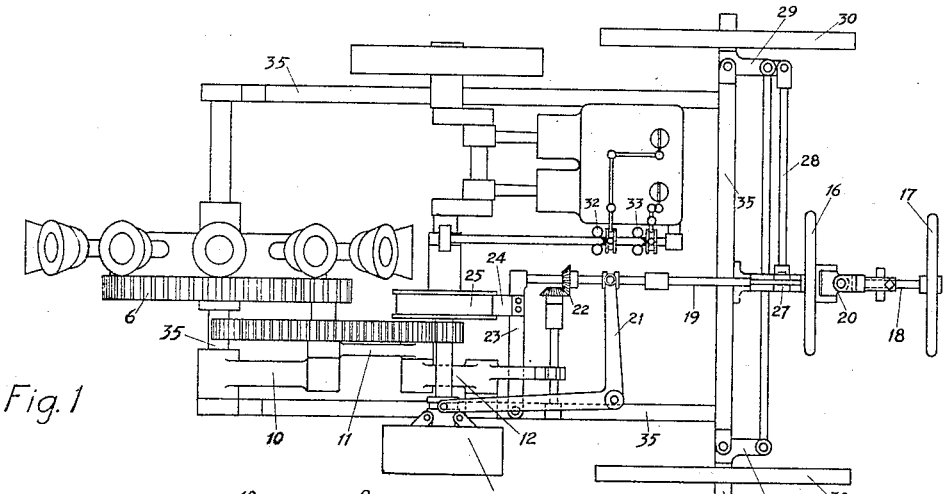
Figure 2:
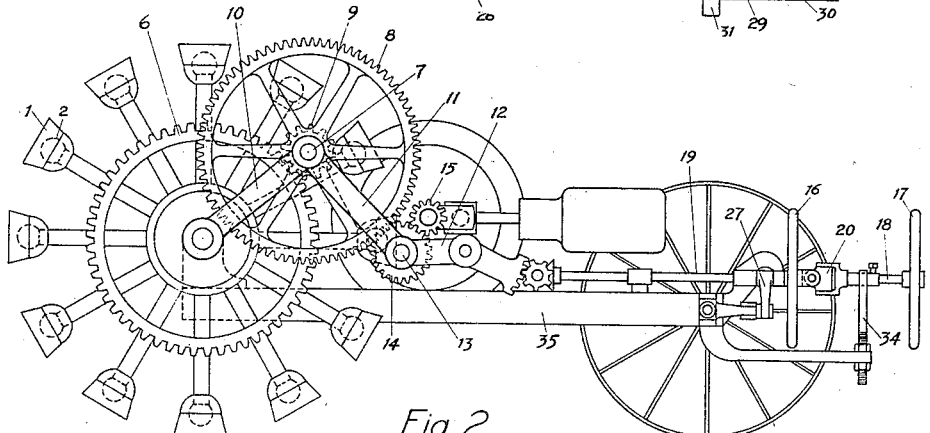
Figures 3, 4, 5:
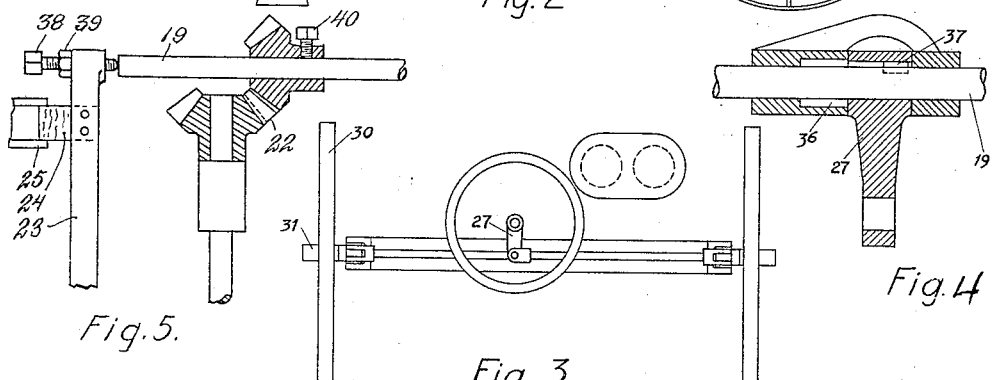

Referring to the drawings, Figure 1 shows a plan view of the machine, Fig. 2 a side elevation with the side of the frame and one steering wheel and the clutch omitted, Fig. 3 is a partial rear end view showing the steering wheels, Fig. 4 shows a detail of the steering mechanism too small to be shown well in Fig. 2, and Fig. 5 shows in detail the construction of the brake operating parts.

The handle controlling the tractor is arranged so the tractor can be controlled from the seat of any farm implement it may be pulling, or may be operated without being followed by any implement. Referring to the drawings, Figs. 1 and 2, 17 is the main steering handwheel carried on shaft 18, which is adjustable in length and height so hand wheel can be supported in convenient position relative to the seat of any implement drawn by the tractor. The universal joint 20 connects this shaft 18 to the main control shaft 19. The steering is controlled by turning the handwheel on its axis and acts through the lever 27 the hub of which contains a loose keyway in which the key 37 and shaft 19 slides. To throw in the clutch 26 and start the tractor moving over the ground the handwheel is drawn toward the operator, moving lever 21, and to stop the tractor the handwheel is pushed forward, in both of these motions key 37 slides lengthwise in hub of lever 27. To reverse direction of travel of tractor the hand wheel is pushed forward till the miter gears 22 come into mesh, which is also sufficient distance that key 37 slides entirely out of hub 27 into hollow space 36 (see Fig. 4) and then handwheel is turned on its axis, thus moving lever 12 up or down and throwing gear 14 in and gear 8 out of mesh with pinion 15 or throwing gear 8 in and gear 14 out of mesh with pinion 15. To apply the brake, pressure is exerted against the handwheel thus pushing brakeblock 24 against the brakewheel 25 through lever 23 against the end of which shaft 19 presses. Fig. 5 shows in detail the construction of the brake operating parts. The set screw 38 and its locknut 39 provide adjustment whereby the wear on brakeblock 24 can be adjusted for, and gears 22 kept from bottoming. In order that the pressure exerted against the handwheel for the purpose of setting the brake, may come between the brakeblock and brakewheel, and not between the teeth of the miter gears 22, these gears must be kept from bottoming, and the movement of shaft 19 must be kept so that the brakeblock 24 will strike brakewheel 25 before the teeth of the miter gears 22 bottom. When the tractor is not followed by an implement, handwheel 17, shaft 18, and universal joint 20, are removed and a seat is placed in support 34 and handwheel 16 is used for control. While operating the reverse or applying the brake the handwheel has no control over the steering of the tractor.

The points which I claim as new invention and for which I desire Letters Patent are the following:

1. In a traction machine, the combination of a steering handwheel or handle; a shaft with steering handwheel or handle fastened thereon; a lever connection which operates the clutch controlling the propelling of the tractor, operated by shaft; a lever operating steering and having above named shaft passing through its hub and hub fitted with means whereby said lever cannot turn on shaft and can slide on shaft in the direction of the axis of the shaft.

2. In a traction machine, the combination of a handwheel; a shaft on which handwheel is fastened; means for operating clutch controlling propelling of tractor by moving shaft in the direction of its axis; means for operating steering of tractor by turning shaft on its axis.

3. In a traction machine, the combination of a handwheel; a shaft on which the handwheel is fastened; means for operating clutch controlling propelling of tractor by moving shaft in the direction of its axis; means for operating steering of tractor by turning shaft on its axis; means for operating a brake by moving shaft.

4. In a traction machine, the combination of a handwheel; a shaft on which the handwheel is fastened; means for operating clutch controlling propelling of tractor by moving shaft in the direction of its axis; means for operating steering of tractor by turning shaft on its axis; means for operating reverse motion of tractor by moving shaft.

5. In a traction machine, the combination of a shaft; means for operating clutch controlling propelling of tractor by moving shaft in the direction of its axis; means for operating steering of tractor by turning shaft on its axis.

6. In a traction machine, the combination of a shaft; means for operating clutch controlling propelling of tractor by moving shaft in the direction of its axis; means for operating steering of tractor by turning shaft on its axis; means for operating reverse motion of tractor by moving shaft.

7. In a traction machine, the combination of a shaft; means for operating clutch controlling propelling of tractor by moving shaft in the direction of its axis; means for operating steering of tractor by turning shaft on its axis; means for operating brake by moving shaft.

8. In a traction machine, the combination of a shaft; a universal joint on end of shaft; a second shaft fastened to universal joint and carrying a handwheel; means for operating clutch controlling propelling of tractor by moving shafts in the direction of their axes; means for operating steering of tractor by turning shafts on their axes.

9. In a traction machine, the combination of a shaft; a universal joint on end of shaft; a second shaft fastened to universal joint and carrying a handwheel; means for operating clutch controlling propelling of tractor by moving shafts in the direction of their axes; means for operating steering of tractor for turning shafts on their axes; means for operating reverse motion of tractor by moving shafts.

10. In a traction machine, the combination of a shaft; a universal joint on end of shaft; a second shaft fastened to universal joint and carrying a handwheel; means for operating clutch controlling propelling of tractor by moving shafts in the direction of their axes; means for operating steering of tractor by turning shafts on their axes; means for operating a brake by moving shafts.

11. In a traction machine, the combination of a shaft; a universal joint on end of shaft; a second shaft fastened to universal joint and adjustable in length and carrying a handwheel; a support under second shaft vertically adjustable; means for operating clutch controlling propelling of tractor by moving shafts in the direction of their axes; means for operating steering of tractor by turning shafts on their axes; means for operating reverse motion of tractor by moving shaft; means for operating brake by moving shaft.

M. ALVA ZOOK.

Witnesses:
 Chas. C. Green,
 F. A. Allwards.

Copies of this patent may be obtained for five cents each, by addressing the "Commissioner of Patents, Washington, D. C."